Oct. 20, 1925.

E. E. PETERSEN 1,558,040

MECHANICALLY WORKED ICE SAW

Filed Nov. 26, 1923

Inventor
E.E.Petersen
by Langner, Parry, Card & Langner
Attys

Patented Oct. 20, 1925.

1,558,040

UNITED STATES PATENT OFFICE.

ERNST EMIL PETERSEN, OF COPENHAGEN, DENMARK.

MECHANICALLY-WORKED ICE SAW.

Application filed November 26, 1923. Serial No. 677,109.

*To all whom it may concern:*

Be it known that I, ERNST EMIL PETERSEN, citizen of the Kingdom of Denmark, residing at Copenhagen, Denmark, have invented certain new and useful Improvements in a Mechanically-Worked Ice Saw, of which the following is a specification.

This invention relates to a mechanically operated ice saw which is mounted on a sleigh and arranged for simultaneous up and down, and back and forth movement. The invention includes an arrangement for maintaining the blade of the saw in a vertical position regardless of the slant of the sleigh.

Two embodiments of the invention are illustrated in the accompanying drawing wherein.

Figure 1:
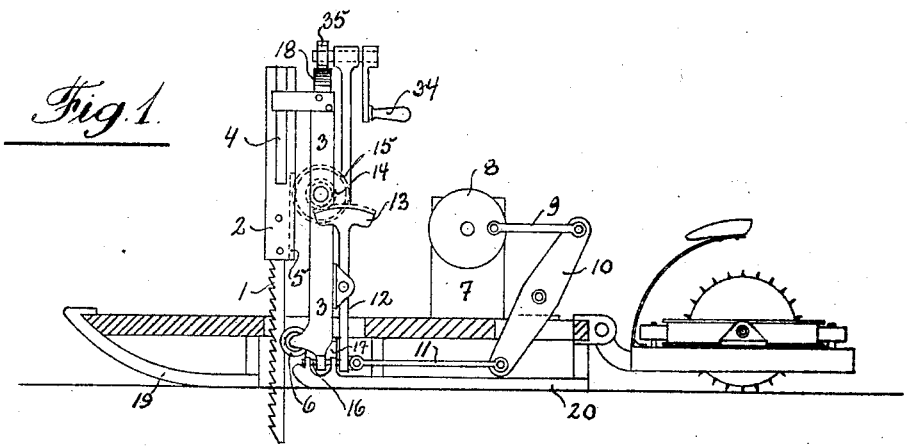
Fig. 1 is a longitudinal section of the device.
Figure 2:
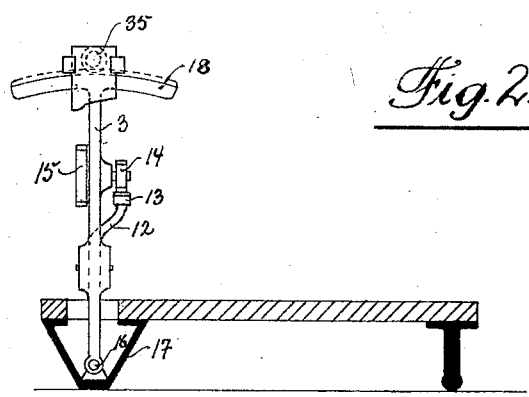
Fig. 2 is a transverse sectional view taken directly in front of the blade, and showing one method for maintaining the saw blade vertical.

The various parts of the machine are mounted on a sleigh one runner of which is divided into two parts 19 and 20, positioned respectively to the front and to the rear of the center line of the saw. The saw blade 1 is adjustably carried in a holder 2 which is guided along a guide 3 by means of a guide slot 4, a roller 6 and a driving gear 15, all as shown in Fig. 1.

A motor 7 is mounted on the sleigh and is connected to reciprocate the holder 2, by means of a crank-disc 8 connected to a rod 9 which rocks the member 10 to which member is connected a rod 11 which reciprocates to rock the lever 12 pivoted to the guide 3 and carrying a rack 13 at its upper end. The rack 13 through pinions carried by guide 3 operates the drive gear 15 which meshes with a rack 5 fastened to the holder 2.

In order that the saw blade may always be positioned vertical regardless of slanting positions of the sleigh due to rough ice, the guide 3 is pivoted on a pin 16 carried by bracket 17 fixed to the under part of the sleigh. At the top, the guide 3 carries a rack 18 and engages with a pinion 35 which is carried on a shaft supported on the sleigh frame and is operable by a crank 34. By manual operation of the crank 34 the guide 3 together with the saw blade and holder can be maintained in a vertical position regardless of the inclination of the sleigh.

Figure 3:
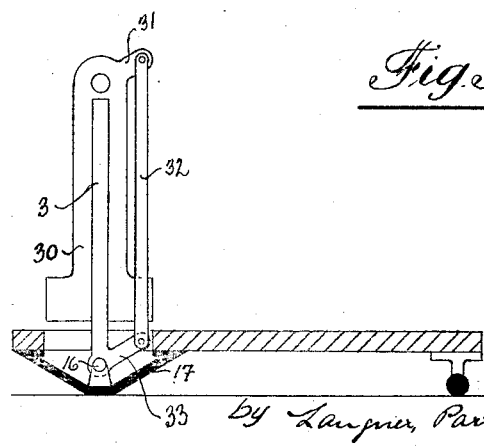
Fig. 3 is a sectional view showing a second form of construction for maintaining the saw blade vertical.

In Fig. 3 a second construction is shown which operates to automatically maintain the saw blade 1 in a vertical position. In this form a pendulum 30 is pivoted to the sleigh frame and through a series of levers 31, 32 and 33 is connected to the guide 3. As is apparent in the showing of Fig. 3 the guide 3 and the pendulum 30 will always remain parallel to each other, and since the pendulum will always swing to a vertical position the saw guide and saw blade will automatically be maintained in a vertical position.

The lever 12 described above is positioned centrally of the sleigh and may, of course, be operated by a pair of rods 11 positioned at either side of the sleigh and connected to the lever 12 by means of a transverse pin.

Having now described my invention what I claim is:

1. A mechanically operated ice saw comprising, a sleigh, a saw, a saw guide pivoted at one end to the sleigh, a slide connection between the saw and the guide, and means for maintaining the saw in vertical position regardless of tilting of the sleigh.

2. A mechanically operated ice saw comprising, a sleigh, a saw, a saw guide pivoted at one end to the sleigh, a slide connection between the saw and the guide, and pendulum means automatically maintaining the saw in a vertical position regardless of tilting of the sleigh.

3. A mechanically operated ice saw comprising, a sleigh, a saw, a saw guide pivoted at one end to the sleigh, a slide connection between the saw and the guide, a pendulum, and levers connecting the pendulum to the saw guide for automatically maintaining the guide and saw in vertical position.

4. A mechanically operated ice saw comprising, a sleigh, a saw, a saw guide pivoted at one end to the sleigh, a slide connection between the saw and the guide, a pendulum pivoted to the sleigh, an arm on the pendulum, an arm on the saw guide, and a rod interconnecting the two arms whereby to maintain the saw guide and saw in a vertical position.

5. A saw according to claim 1, said means being automatic.

In testimony whereof, I have signed my name to this specification.

ERNST EMIL PETERSEN.